US009572198B1

(12) United States Patent
Shah et al.

(10) Patent No.: US 9,572,198 B1
(45) Date of Patent: Feb. 14, 2017

(54) INTER-TECHNOLOGY DIVERSITY IN WIRELESS COMMUNICATIONS

(71) Applicant: Sprint Spectrum L.P., Overland Park, KS (US)

(72) Inventors: Maulik Shah, Overland Park, KS (US); Jason Sigg, Overland Park, KS (US); Jasinder Singh, Olathe, KS (US); Kurt M. Landuyt, Parkville, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 714 days.

(21) Appl. No.: 13/788,171

(22) Filed: Mar. 7, 2013

(51) Int. Cl.
*H04W 4/00* (2009.01)
*H04W 92/02* (2009.01)

(52) U.S. Cl.
CPC .................................. *H04W 92/02* (2013.01)

(58) Field of Classification Search
CPC ....... H04W 88/06; H04W 48/18; H04B 1/405; H04B 1/406; H04B 1/005
USPC .......................................... 455/552.1, 553.1
See application file for complete search history.

(56) References Cited

U.S. PATENT DOCUMENTS

| | | | |
|---|---|---|---|
| 6,721,707 B1* | 4/2004 | Chu | H04L 1/0014 455/560 |
| 2007/0032265 A1* | 2/2007 | Park | H04H 20/426 455/552.1 |
| 2014/0248862 A1* | 9/2014 | Periyalwar | H04W 48/18 455/418 |

* cited by examiner

*Primary Examiner* — Vladimir Magloire
*Assistant Examiner* — Juan C Perez Tolentino

(57) ABSTRACT

A method and system is disclosed for inter-technology diversity. A transmitting device may concurrently transmit a communication unit, such as a data packet, on two or more different air interfaces to a receiving device. The receiving device may concurrently receive the two or more transmissions on two or more corresponding air interfaces, and may then apply forward error correction to the two or more received communication unit in order to recover an error-free version of the communication unit. The transmitting device could be a multi-modal base station (or other access element) of a wireless communication system, and the receiving device could be a multi-modal access terminal (AT) or other user equipment (UE). Additionally or alternatively, the transmitting device could be an AT or UE, and the receiving device could be a base station.

12 Claims, 7 Drawing Sheets

INTER-TECHNOLOGY DIVERSITY IN WIRELESS COMMUNICATIONS

BACKGROUND

In a typical cellular radio communication system (wireless communication system), an area is divided geographically into a number of cell sites, each defined by a radio frequency (RF) radiation pattern from a respective antenna or antenna system. The antennas in the cells are in turn coupled to one or another form of controller, which is then coupled to a telecommunications switch or gateway, such as a mobile switching center (MSC) and/or a packet data serving node (PDSN) for instance. These (and possibly other) elements function collectively to form a Radio Access Network (RAN) of the wireless communication system. The switch or gateway may then be coupled with a transport network, such as the PSTN or a packet-switched network (e.g., the Internet).

Depending on the specific underlying technologies and architecture of a given wireless communication system, the RAN elements may take different forms. In a code division multiple access (CDMA) system configured to operate according to IS-2000 and IS-856 standards, for example, the antenna system is referred to as a base transceiver system (BTS), and is usually under the control of a base station controller (BSC). In a universal mobile telecommunications system (UMTS) configured to operate according to ITU IMT-2000 standards, the antenna system is usually referred to as a NodeB, and is usually under the control of a radio network controller (RNC). Other architectures and operational configurations of a RAN are possible as well.

A subscriber (or user) in a service provider's wireless communication system accesses the system for communication services via a communication device, such as a cellular telephone, "smart" phone, pager, or appropriately equipped portable computer, for instance. In a CDMA system the communication device is referred to as an access terminal (also referred to herein by "AT"); in a UMTS system the communication device is referred to as user equipment (also referred to herein by "UE"). When an AT or UE is positioned in a cell, it communicates via an RF air interface with the BTS or NodeB antenna of the cell. Consequently, a communication path or "channel" is established between the AT or UE and the transport network, via the air interface, the BTS or NodeB, the BSC or RNC, and the switch or gateway.

As the demand for wireless communications has grown, the volume of call traffic in most cell sites has correspondingly increased. To help manage the call traffic, most cells in a wireless network are usually further divided geographically into a number of sectors, each defined respectively by radiation patterns from directional antenna components of the respective BTS or NodeB, or by respective antennas. These sectors can be referred to as "physical sectors," since they are physical areas of a cell site. Therefore, at any given instant, an AT or UE in a wireless network will typically be positioned in a given physical sector and will be able to communicate with the transport network via the BTS or NodeB serving that physical sector.

The functional combination of a BTS of a cell or sector with a BSC, or of a NodeB and an RNC, is commonly referred to as a "base station." The actual physical of a configuration of a base station can range from an integrated BTS-BSC or NodeB-RNC unit to a distributed deployment of multiple BTSs under a single BSC, or multiple NodeBs under a single RNC. A base station may be typically deployed to provide coverage over a geographical area on a scale of a few to several square miles and for tens to hundreds to several thousands (or more) of subscribers at any one time.

As a subscriber at an AT or UE moves between wireless coverage areas of a wireless communication system, such as between cells or sectors, or when network conditions change or for other reasons, the AT or UE may "hand off" from operating in one coverage area to operating in another coverage area. In a usual case, this handoff process is triggered by the AT or UE monitoring the signal strength of various nearby available coverage areas, and the BSC or RNC (or other controlling network entity) determining when one or more threshold criteria are met. For instance, an AT may continuously monitor signal strength from various available sectors and notify a BSC when a given sector has a signal strength that is sufficiently higher than the sector in which the AT is currently operating. The BSC may then direct the AT to hand off to that other sector. By convention, an AT or UE is said to handoff from a "source" cell or sector (or base station) to a "target" cell or sector (or base station).

In some wireless communication systems or markets, a wireless service provider may implement more than one type of air interface protocol. For example, a carrier may support one or another version of CDMA, such as EIA/TIA/IS-2000 Rel. 0, A, and CDMA 2000 Spread Spectrum Systems Revision E (collectively referred to generally herein as "IS-2000") for both circuit-cellular voice and data traffic, as well as a more exclusively packet-data-oriented protocol such as EIA/TIA/IS-856 Rel. 0, A, or other version thereof (hereafter "IS-856"). A carrier could also implement an orthogonal frequency division multiple access (OFDMA) based system according to protocols specified by third generation partnership project (3GPP) Long Term Evolution ("LTE") Advanced, for example. Access terminals or UEs may be capable of communication under any or all such protocols, and may further be capable of handing off between them, in addition to being able to hand off between various configurations of coverage areas.

OVERVIEW

As noted above, an AT or UE may be capable of operating under more than one air-interface protocol. More particularly, an AT or UE may include one or more transceiver components that, coupled with one or more antennas, provide a multi-technology air interface capable of transmitting and receiving wireless signals according to each of multiple, different physical radio transmission/reception technologies. A multi-technology air interface can be viewed as including multiple air interfaces, each based on a respective air-interface technology, and each configured to operate according to a respective air-interface protocol. Such an AT or UE may thus be capable of operating under various, different air interface protocols, and/or according to various, different air-interface technologies. For operation in the context of a RAN, an air-interface technology may also be considered a radio access technology. Expanding on the list of examples given above, different air-interface technologies and protocols could include 1×RTT, 1×EV-DO, LTE, WiMAX, iDEN, TDMA, AMPS, GSM, GPRS, UMTS, EDGE, MMDS, WI-FI, and BLUETOOTH, for example.

In a similar manner, an access element of a RAN, such as a base station or BTS, may also include a multi-technology air interface for communications with ATs or UEs according to one or another of the multiple air-interface technologies supported. Sometimes referred to as a "multi-modal" access node or "multi-technology" access node, such a RAN element may also connect to a wireless communication system or network within which it is deployed by way of multiple network-side protocol interfaces. More particularly, while different air-interface technologies may describe or define physical characteristics of transmitting and receiving signals on different air interfaces, a multi-modal access node may also bridge or route air-interface communications transmitted and received on different air-interface technologies to different types of network elements and different network architectures on the network side. In this sense, an air-interface protocol may also include some protocol elements that specify how network communications, as well as communications on the physical air interface, are carried out.

Communications from a RAN access node to an AT or UE are carried on a "forward link" or "downlink" of the air interface, and communications from an AT or UE to a RAN access node are carried on a "reverse link" or "uplink" of the air interface. On either link, transmission errors can lead to imperfectly received communications, such as incomplete reception of data or data received with errors. Transmission errors could be caused by RF noise and/or interference, or underpowered transmissions, for example. Among various approaches that may be available for correcting errors in received data, and more generally for improving reliability of transmission, "diversity" is a technique that combines or merges multiple copies of the same data received on multiple transmissions. More particularly, by appropriately encoding data upon transmission, error correction algorithms implemented on a receiving device may be able to recover error-free data by merging multiple received versions, some or all of which may contain errors due to imperfect transmission.

In conventional applications of diversity, the multiple transmissions of the same data may be separated in time, space, or frequency, but otherwise all utilize a common air-interface technology. Diversity techniques aim to derive benefit from potentially different characteristics of the different transmissions that may result from different transmission times for temporal diversity, different transmission paths for spatial diversity, or different carrier frequencies for frequency diversity. Yet the effectiveness of conventional techniques may be inherently limited by using just one technology. In contrast, the integration of different types of air-interface technologies employed by a multi-technology air interface may be well suited for collective resiliency of transmissions, particularly under operating conditions in which transmissions may be error-prone. By transmitting the same data on more than one type of air interface of a transmitting device at the same time, a receiving device may concurrently receive redundant copies of transmitted data via each employed technology, and thereby implement error correction based on "inter-technology diversity."

Hence, in one respect, various embodiments of the present invention provide, in a first device communicatively coupled with a second device via a multi-technology air interface, a method comprising: receiving a first signal transmitted by the second device via a first air-interface technology, the first signal carrying a particular communication unit; concurrently with receiving the first signal, receiving a second signal transmitted by the second device via a second air-interface technology, the second signal carrying a duplicate of the particular communication unit, wherein the first air-interface technology and the second air-interface technology are different; recovering both a received version of the particular communication unit from the received first signal and a received version of the duplicate of the particular communication unit from the received second signal; and merging the received version of the particular communication unit and the received version of the duplicate of the particular communication unit according to an error-correction algorithm to recover a transmission-error-free copy of the particular communication unit.

In another respect, various embodiments of the present invention provide, in a first device communicatively coupled with a second device via a multi-technology air interface, a method comprising: transmitting a signal using a first air-interface technology to the second device; making a determination that communication units carried by the signal are subject to at least one of a network loading condition, a threshold latency condition, or a threshold transmission error condition; and responsive to making the determination, transmitting a first signal to the second device using the first air-interface technology and concurrently transmitting a second signal to the second device using a second air-interface technology, wherein the first signal carries one or more particular communication units, and the second signal carries duplicates of the one or more particular communication units, and wherein the first air-interface technology and the second air-interface technology are different.

In still another respect, various embodiments of the present invention provide, a first device configured for communicating with a second device via a multi-technology air interface, the first device comprising: one or more processors; memory; and machine-readable instructions stored in the memory, that upon execution by the one or more processors cause the first device to carry out operations comprising: receiving a first signal transmitted by the second device via a first air-interface technology, wherein the first signal carries a particular communication unit, concurrently with receiving the first signal, receiving a second signal transmitted by the second device via a second air-interface technology, wherein the second signal carries a duplicate of the particular communication unit, and wherein the first air-interface technology and the second air-interface technology are different, recovering both a received version of the particular communication unit from the received first signal and a received version of the duplicate of the particular communication unit from the received second signal, and merging the received version of the particular communication unit and the received version of the duplicate of the particular communication unit according to an error-correction algorithm to recover a transmission-error-free copy of the particular communication unit.

These as well as other aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate the invention by way of example only and, as such, that numerous variations are possible. For instance, structural elements and process steps can be rearranged, combined, distributed, eliminated, or otherwise changed, while remaining within the scope of the invention as claimed.

DETAILED DESCRIPTION

Example embodiments presented herein will be described by way of example with reference to wireless communication systems. It will be appreciated that wireless communication systems can employ a range of technologies designed to operate according to a number of related standards and protocols, including, without limitation, LTE Advanced, IS-2000, IS-856, IMT-2000, WiMax, and WiFi, among others, in order to deliver both circuit-cellular and wireless packet-data services. Underlying access technologies include CDMA, time division multiple access (TDMA), and orthogonal frequency division multiple access (OFDMA), among others.

Wireless communications systems can generally be classified under the umbrella of one or another representative system architecture. One example is a "CDMA network," which, despite its label, can include both CDMA-based wireless access (e.g., as specified under IS-2000) and TDMA-based wireless access (e.g., as specified under IS-856), among other technologies. Other examples include "UMTS networks," which also can include CDMA-based wireless access (e.g., as specified under IMT-2000), and "LTE Advanced networks," which can include OFDMA-based wireless access, and are sometimes considered as next-generation variants of, and deployed within, UMTS networks.

Inter-technology diversity, described by way of example embodiments herein, can involve both transmitting and receiving devices in a wireless communication system. Example methods carried out on both types of devices are discussed below.

Figure 1:
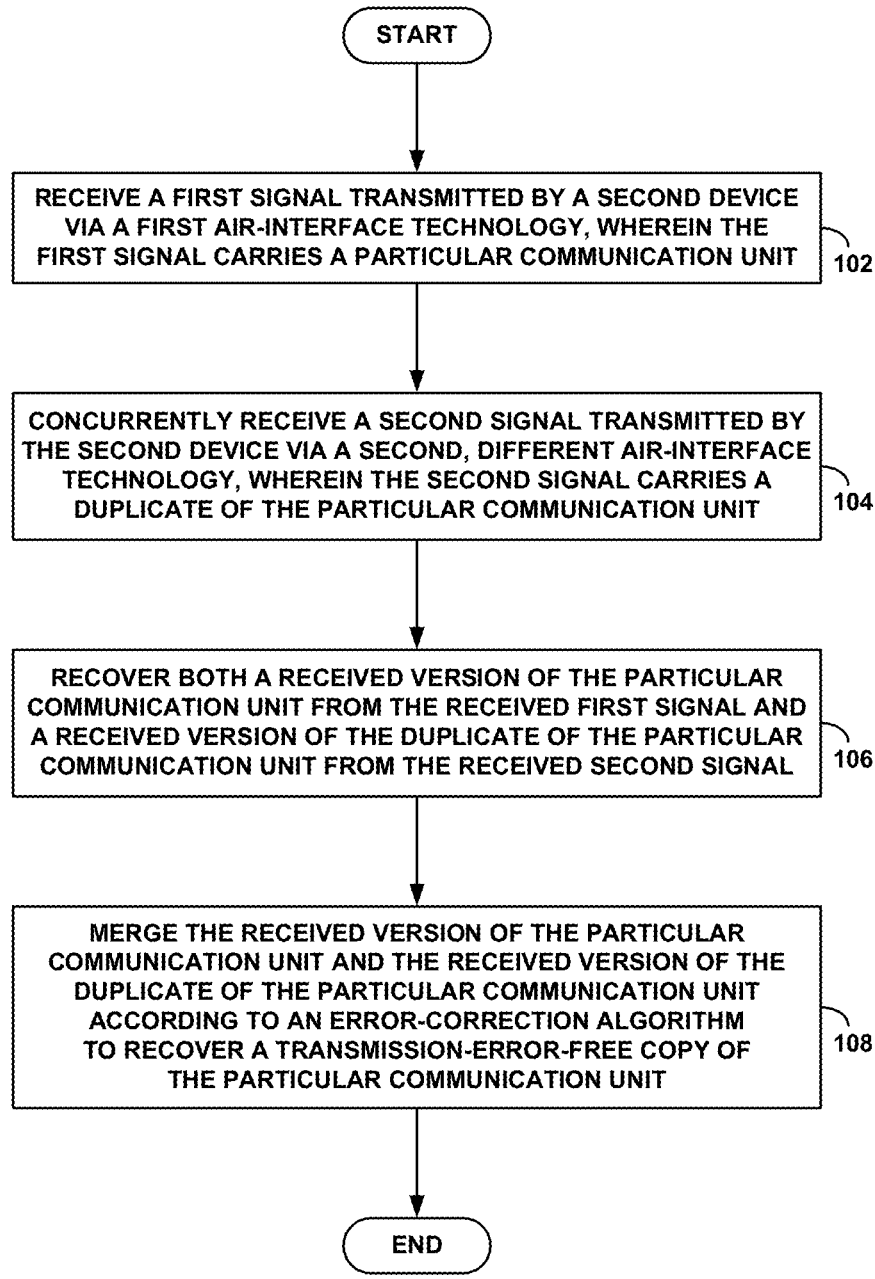
FIG. 1 is a flowchart depicting an example embodiment of a method inter-technology diversity carried out by a receiving device.

FIG. 1 is a flowchart depicting an example embodiment of a method inter-technology diversity carried out by a receiving device. By way of example, the steps of the flowchart could be implemented in a first, receiving device, such as an AT or UE, or a RAN access node (e.g., base station or BTS), configured to operate in a wireless communication system.

At step 102, the first, receiving device receives a first signal transmitted by a second, transmitting device via a first air-interface technology. The first signal may carry a particular communication unit, which could be a data packet, for example. By way of example, the first, receiving device could be an AT or UE configured for operating in a wireless communication system, and the second, transmitting device could be a base station or RNC, such as a BTS or NodeB, which is part of the wireless communication system. A base station could also be or include an "evolved NodeB" (eNodeB) configured to operate under LTE Advanced.

Alternatively, and again by way of example, the first, receiving device could be a base station or RNC, BTS, NodeB, or eNodeB that is part of the wireless communication system, and the second, transmitting device could be an AT or UE configured for operating in the wireless communication system.

At step 104, the first, receiving device concurrently receives a second signal transmitted by the second, transmitting device via a second, different air-interface technology. The second signal may carry a duplicate of the particular communication unit, which could thereby be a duplicate of the data packet. As discussed by way of example above, the first air-interface technology could be any one of 1X-RTT, EVDO, LTE, LTE Advanced, WiFi, or WiMax, and the second air-interface technology could be any different one of the these possibilities. It should be understood that this list is not exclusive of other possible types of air-interface technologies.

At step 106, the first, receiving device recovers both a received version of the particular communication unit from the received first signal and a received version of the duplicate of the particular communication unit from the received second signal. More particularly, for communication units that are data packets, the first, receiving device could process the first signal with a receiver operating according to the first air-interface technology to generate a received version of the data packet. Similarly, the first, receiving device could process the second signal with a receiver operating according to the second air-interface technology to generate a received version of a duplicate of the data packet.

Finally, at step 108, the receiving device merges the received version of the particular communication unit and the received version of the duplicate of the particular communication unit using an error-correction algorithm to recover a transmission-error-free copy of the particular communication unit. Again, for communication units that are data packets, the first, receiving device could process the received version of the data packet together with the received version of the duplicate of the data packet with a forward error correction algorithm to generate a copy of the data packet that is free of transmission errors. Applying error correction to data packets received via different air-interface technologies thereby derives a benefit of inter-technology diversity.

It can be the case that the first and second air-interface technologies provide different bandwidths and/or transmission rates. As a result (or possibly as a consequence of operating conditions and/or other factors), reception and recovery of the received version of the particular communication unit via the first air-interface could complete at a different time than reception and recovery of the received version of the duplicate of the particular communication unit via the second air-interface. In this circumstance, merging of the received versions of the particular communication unit and the duplicate of the particular communication unit may be delayed until completion of whichever takes longer to be received and recovered. The difference in completion times might typically be on the order of a few milliseconds or less, for example, but still on a scale that warrants consideration when compared with processing rates. By way of example, and for purposes of illustration, completion of reception and recovery of the received version of the particular communication unit via the first air-interface is taken to complete first.

It can further be the case that upon completion of reception and recovery of the received version of the particular communication unit, and prior to that of the received version of the duplicate of the particular communication unit, a determination is made that a transmission error of the received version of the particular communication unit is below a threshold level. More particularly, the threshold level could correspond to an error rate below which error correction applied to just the received version of the particular communication unit alone is capable of yielding a transmission-error-free copy of the particular communication unit. By way of example, the threshold level could be a 0.1, corresponding to an error rate of 10 percent. In accordance with example embodiments, when such a determination is made, recovery of the received version of the duplicate of the particular communication unit may be discontinued. Merging could then correspond to applying error correction to only the received version of the particular communication unit.

In further accordance with example embodiments, applying error correction to only the received version of the particular communication unit could correspond to bypassing error correction if the received version of communication unit is free of transmission errors. For example, if a data packet is received without any errors on the first air interface prior to recovery of a duplicate of the data packet from the second air interface, recovery on the second air interface could be discontinued, and error correction of the received packet bypassed.

In accordance with example embodiments, inter-technology diversity may not necessarily be limited to utilizing only two different air-interface technologies. Thus, the example method could further include aspects relating to additional air-interface technologies. More particularly, the first, receiving device could, concurrently with receiving the first and second signals, receive at least one additional (e.g., third) signal transmitted by the second device via a corresponding additional (e.g., third) air-interface technology. The additional air-interface technology could be different from both the first air-interface technology and the second air-interface technology, and the additional signal could carry an additional duplicate of the particular communication unit (e.g., data packet). The first, receiving device could recover a received version of the additional duplicate of the particular communication unit from the additional signal, and then additionally merge it with both the received version of the particular communication unit and the received version of the duplicate of the particular communication unit. In this case, the error-correction algorithm could be applied to the three or more different copies of the received particular communication unit—one via each air-interface technology—in order to recover a transmission-error-free copy of the particular communication unit.

Figure 2:
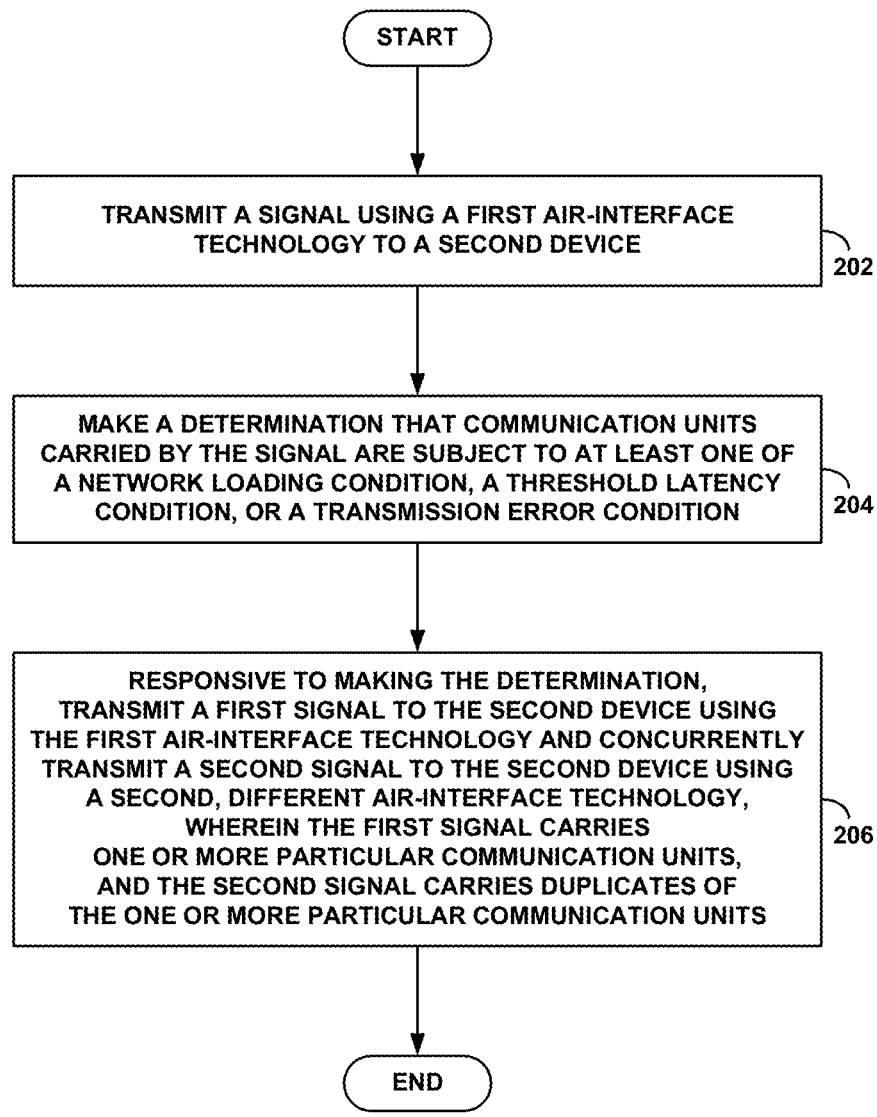
FIG. 2 is a flowchart depicting an example embodiment of a method inter-technology diversity carried out by a transmitting device.

FIG. 2 is a flowchart depicting an example embodiment of a method inter-technology diversity carried out by a transmitting device. As with the example method of FIG. 1, the steps of the flowchart in FIG. 2 could be implemented in a first, transmitting device, such as an AT or UE, or a RAN access node (e.g., base station or BTS), configured to operate in a wireless communication system.

At step 202, a first, transmitting device transmits a signal using a first air-interface technology to a second, receiving device. By way of example, the first, transmitting device could be an AT or UE configured for operating in a wireless communication system, and the second, receiving device could be a base station, BTS, NodeB, or eNodeB that is part of the wireless communication system. Alternatively, and again by way of example, the first, transmitting device could be a base station, BTS, NodeB, or eNodeB that is part of the wireless communication system, and the second, receiving device could be an AT or UE configured for operating in the wireless communication system.

At step 204, the first, transmitting device makes a determination that communication units carried by the signal are subject to at least one of a network loading condition, a threshold latency condition, or a threshold transmission error condition. By way of example, the network loading condition could correspond to a relative utilization level among different air-interface technologies supported by the first transmitting device. Also by way of example, the latency condition could correspond to a volume of data to be carried by the communication units, a threshold delay for data deliver, or a type of application or program that will consume and/or process the data carried by the communication units received by second, receiving device. Again by way of example, the threshold transmission error condition could correspond to a threshold error rate for received data.

Finally, at step 206, in response to making the determination, the first, transmitting device transmits a first signal to the second device using the first air-interface technology and concurrently transmits a second signal to the second device using a second air-interface technology. In the concurrent transmissions, the first signal may carry one or more particular communication units, and the second signal may carry duplicates of the one or more particular communication units. In accordance with inter-technology diversity, the first air-interface technology and the second air-interface technology may be different. Again by way of example, the first air-interface technology could be any one of 1X-RTT, EVDO, LTE, WiFi, or WiMax, and the second air-interface technology could be any different one of the these possibilities. Other types of air-interface technologies are possible as well. As with the communication units, the one or more particular communication units may also be data packets.

In accordance with example embodiments, making the determination that communication units carried by the signal are subject to at least one of the network loading condition, the threshold latency condition, or the transmission error condition could correspond to determining that one of more conditions relating to loading, latency, or transmission error rate have been met or satisfied. By way of example, a list of such conditions could include: (i) a utilization of the first air-interface technology for transmissions to the second, receiving device exceeds a first utilization threshold, (ii) a utilization of the second air-interface technology for transmissions to the second, receiving device is less than a second utilization threshold, (iii) a volume of data carried by the communication units exceeds a threshold volume, (iv) a threshold delay for data delivery to the second, receiving device has been exceeded, (v) the data carried by the communication units are directed to a particular application running on the second, receiving device, and (vi) a threshold rate of transmission errors has been exceeded. Then the determination made at step 204 could correspond to determining that any one or more of the conditions in the list has been met or satisfied.

Inter-technology diversity as implemented by the example method on the first, transmitting device diversity may not necessarily be limited to utilizing only two different air-interface technologies. Accordingly, the example method of FIG. 2 could further include aspects relating to additional air-interface technologies. More particularly, the first, transmitting device could concurrently transmit at least one additional (e.g., a third) signal to the second device using a corresponding one additional (e.g., third) air-interface technology. The additional air-interface technology could be different from both the first air-interface technology and the second air-interface technology, and additional signal could carry additional duplicates of the one or more particular communication units (e.g., data packets).

It will be appreciated that the example embodiments illustrated in FIGS. 1 and 2 could each include alternate and/or additional steps, while still remaining within the scope and spirit of example embodiments herein.

Figure 3:
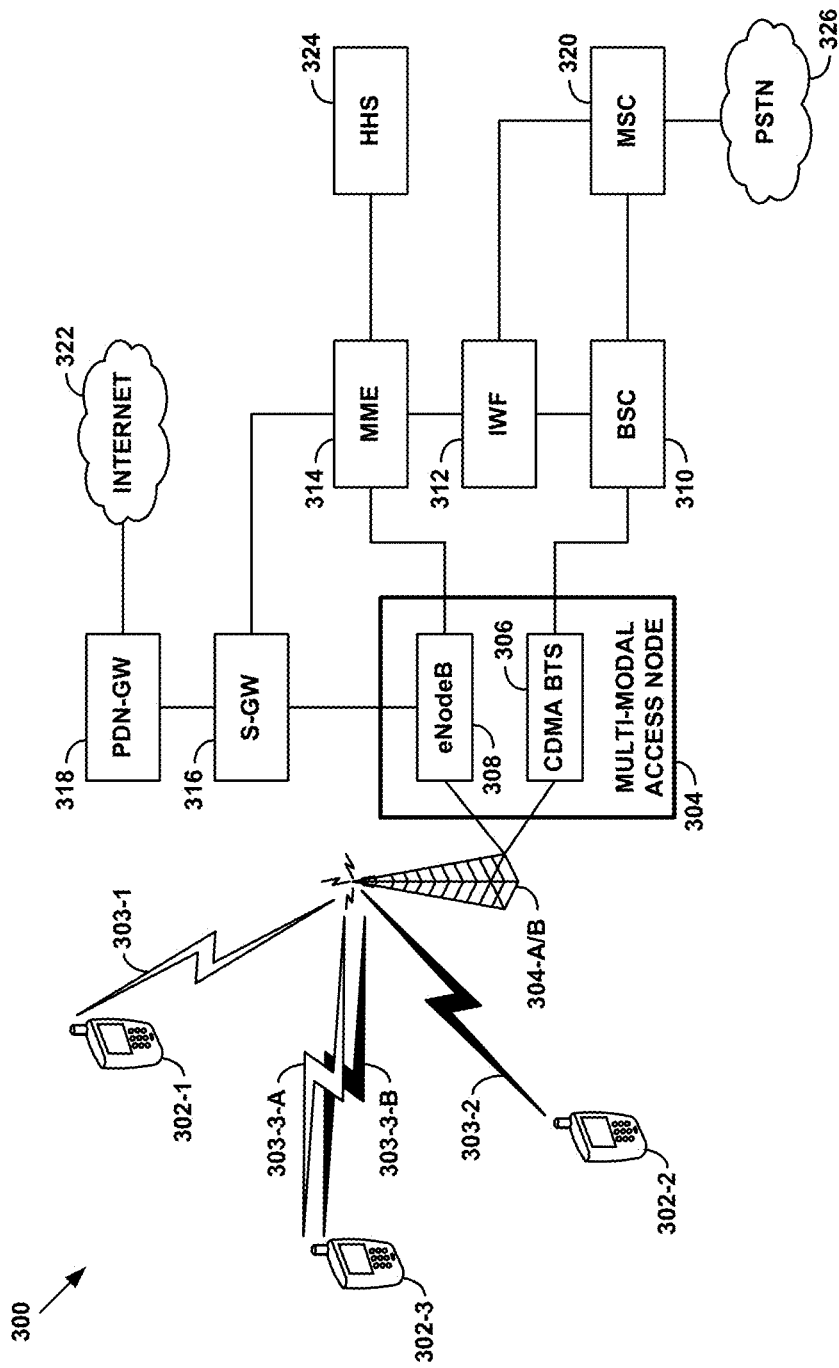
FIG. 3 illustrates an example of wireless communication system in which inter-technology diversity could be implemented, in accordance with example embodiments.

FIG. 3 shows a simplified block diagram of an example wireless network 300 that can be operated by a wireless service provider, and in which an example method of inter-technology diversity could be carried out. By way of example, the network 300 includes a multi-modal RAN that can support both CDMA-based air interface communications (e.g., as specified under both IS-2000 and IS-856) and OFDMA-based air interface communications (e.g., as specified under LTE Advanced). For purposes of the present discussion, the term "multi-modal" may thus be taken as referring to two air-interface technologies. It will be appreciated, however, that a network such as network 300 could include support for other types of air-interface technologies as well, in which case "multi-modal" may be considered as referring to any two or more such technologies.

The network 300 includes a multi-modal antenna system 304-A/B, where the label "A/B" signifies that the antenna system supports at least two different air-interface technologies arbitrarily labeled "A" for an LTE Advanced based air interface, and "B" for CDMA based air interface. As shown, the multi-modal antenna system 304-A/B can be considered antenna and transceiver elements of a multi-modal access node 304, which in turn includes a CDMA BTS 306 for CDMA based communications and an eNodeB 308 for LTE Advance based communication, each respectively coupled with the multi-modal antenna system 304-AB.

The example illustrated in FIG. 3 also shows three ATs 302-1, 302-2, and 302-3. (For purposes of convenience in the remaining discussion herein, the term "AT" will be used to refer to both an access terminals and UEs; the term "UE" will generally not be used further.) Each AT is depicted as having at least one active air interface of particular type with the antenna system 304-A/B. Specifically, the AT 302-1 has an air interface 303-1; the AT 302-2 has an air interface 303-2; and the AT 302-3 has two air interfaces 303-3-A and 303-3-B. For purposes of illustration, and by way of example, the air interfaces 303-1 and 303-3-A may be taken to be LTE Advance air interfaces, and the air interfaces 303-2 and 303-3-B may be taken to be CDMA air interfaces. As a visual cue, the LTE Advanced air interfaces are depicted as white-filled "lightning bolts," and the CDMA air interfaces are depicted as blackened "lightning bolts." The two air interfaces 303-3-A and 303-3-B depicted for the AT 302-3 may be taken as representing a capability of the AT 302-3 to operate according to either air interface separately, and/or to operate according to both concurrently. Concurrent operation is described in further detail below in connection with particular aspects of example embodiments of inter-technology diversity.

For communications under LTE Advanced based protocols, subscribers may engage in communications via antenna system 304-A/B from the AT 302-1 over air interface 303-1 and/or from the AT 302-3 over air interface 303-3-A. Transmissions over the air interface 303-1 from the antenna system 304-A/B to the AT 302-1 represent a "downlink" from the eNodeB 308 to the AT 302-1 (or, again, "UE" in the context of LTE Advanced), while transmissions over air interface 303-1 from the AT 302-1 to the antenna system 304-A/B represent an "uplink" from the AT 302-1. Similarly, transmissions over the air interface 303-3-A from the antenna system 304-A/B to the AT 302-3 represent a downlink, while transmissions over air interface 303-3-A from the AT 302-3 to the antenna system 304-A/B represent an uplink. Under LTE Advanced, the downlink operates according to OFDMA, while the uplink operates according to Single Carrier Frequency Division Multiple Access (SC-FDMA).

The eNodeB 308 may be connected to a serving gateway S-GW 316, which in turn may be connected to an internet 322 via a packet data network gateway PDN-GW 318. The eNodeB 308 could also be connected to the S-GW 316 by way of a mobility management entity MME 314, which may also be configured to control communications between the eNodeB 308 and one or more other eNodeBs in the network. The MME 314 may also be communicatively coupled to a home subscriber server (HSS) 324, which stores subscriber information, including information about the AT 302-1 and/or AT 302-3. For cellular voice communications, the eNodeB may connect to a MSC 320 by way of an interworking function IWF 312 communicatively connected between the MME 312 and the MSC 320. The MSC 320 may then provide connectivity of a PSTN 326, as shown.

For communications under CDMA based protocols, subscribers may engage in communications via antenna system 304-A/B from the AT 302-2 over air interface 303-2 and/or from the AT 302-3 over air interface 303-3-B. Transmissions over the air interface 303-2 from the antenna system 304-A/B to the AT 302-2 represent a "forward link" from the CDMA BTS 306 to the AT 302-2, while transmissions over air interface 303-2 from the AT 302-2 to the antenna system 304-AB represent a "reverse link" from the AT 302-2. Similarly, transmissions over the air interface 303-3-B from the antenna system 304-A/B to the AT 302-3 represent a forward link, while transmissions over air interface 303-3-B from the AT 302-3 to the antenna system 304-A/B represent an reverse link.

The CDMA BTS 306 may be connected to a BSC 310, which provides a connection to the MSC 320 for cellular voice communications. The MSC 320 acts to control assignment of air traffic channels (e.g., over air interfaces 303-2 and 303-3-B), and provides access to wireless circuit-switched services such as circuit-voice and circuit-data (e.g., modem-based packet data) service. As represented by its connection to the PSTN 326, the MSC 320 may also be coupled with one or more other MSCs, other telephony circuit switches in the operator's (or in a different operator's) network, or other wireless communication systems, thereby supporting user mobility across MSC regions, roaming between systems, and local and long-distance landline telephone services.

For packet data communications, the IWF 312 connected between the BSC 310 and the MME 314 can support interworking between CDMA based packet protocols and those of the LTE Advanced based network. Thus, the BSC 310 may communicate on the internet 322 by way of the MME 314, the S-GW 316, and the PDN GW 318.

It should be understood that the depiction of just one of each network element in FIG. 3 is illustrative, and there could be more of any of them, as well as other types of elements not shown. The particular arrangements shown in FIG. 3 should not be viewed as limiting with respect to the example embodiments presented herein. Further, the network components that make up a wireless communication system such as network 300 are typically implemented as a combination of one or more integrated and/or distributed platforms, each comprising one or more computer processors, one or more forms of computer-readable storage (e.g., disks drives, random access memory, etc.), one or more communication interfaces for interconnection between elements and the network and operable to transmit and receive the communications and messages described herein, and one or more computer software programs (or other forms of computer logic instructions) and related data (e.g., machine-language instructions and program and user data) stored in the one or more forms of computer-readable storage and executable by the one or more computer processors to carry out the functions, steps, and procedures of the various example embodiments described herein. Similarly, a communication device such as example ATs 302-1, 302-2, and 302-3, typically comprises a user-interface, I/O components, a communication interface, a tone detector, a processing unit, and data storage, all of which may be coupled together by a system bus or other mechanism. As such, network 300, ATs 302-1, 302-2, and 302-3, and air interfaces 303-1, 303-2, 303-3-A, and 303-3-B collectively are representative of example means of implementing and carrying out the various functions, steps, and procedures described herein.

EXAMPLE ACCESS TECHNOLOGIES a. Conventional CDMA Communications

In a conventional CDMA wireless network compliant with the well known IS-2000 standard, each cell employs one or more carrier frequencies, typically 1.25 MHz in bandwidth each, and each sector is distinguished from adjacent sectors by a pseudo-random number offset ("PN offset"). Further, each sector can concurrently communicate on multiple different channels, distinguished by "Walsh codes." In doing so, each channel is allocated a fraction of the total power available in the sector. When an access terminal operates in a given sector, communications between the access terminal and the BTS of the sector are carried on a given frequency and are encoded by the sector's PN offset and a given Walsh code. The power allocated to each channel is determined so as to optimize the signal to noise characteristics of all the channels, and may vary with time according to the number of access terminals being serviced, and their relative positions with respect to the BTS, among other factors.

Air interface communications are divided into forward link communications, which are those passing from the base station to the access terminal, and reverse link communications, which are those passing from the access terminal to the base station. In an IS-2000 system, both the forward link and reverse link communications in a given sector are encoded by the sector's PN offset and a given Walsh code. On the forward link, certain Walsh codes are reserved for use to define control channels, including a pilot channel, a sync channel, and one or more paging channels (depending on service demand, for example), and the remainder can be assigned dynamically for use as traffic channels, i.e., to carry user communications. Similarly, on the reverse link, one or more Walsh codes may be reserved for use to define access channels, and the remainder can be assigned dynamically for use as traffic channels.

In order to facilitate efficient and reliable handoff of access terminals between sectors, under IS-2000 an AT can communicate on a given carrier frequency with a number of "active" sectors concurrently, which collectively make up the AT's "active set." Depending on the system, the number of active sectors can be up to six (currently). The access terminal receives largely the same signal from each of its active sectors and, on a frame-by-frame basis, selects the best signal to use. An AT's active set is maintained in the access terminal's memory, each active sector being identified according to its PN offset. The AT continually monitors a pilot signal from each of its active sectors as well as from other sectors, which may vary as the AT moves about within the wireless communication system, or as other factors cause the AT's RF conditions to change. More particularly, the AT monitors a signal-to-noise metric referred to as "signal to interference plus noise ratio" ("SINR"), which includes the degrading effects of interference as well as noise on RF conditions. The AT reports the received signal strengths to the serving base station, which then directs the AT to update its active set in accordance with the reported strengths and one or more threshold conditions. Note that an AT's active set can include a femtocell.

Typically, the power level of the pilot detected by an AT is specified as a gain level, x, according to the relation x dBm=10 $\log_{10}$(P/1 mW), where P is the power in mW (milliwatts). However, other power units could be specified. Measured in dBm, gain expresses a logarithmic ratio of power P to a fixed power level of 1 mW. More generally, the relative gain, y, of one power level $P_1$ to another $P_2$ is expressed as dB, and corresponds to a logarithmic ratio of $P_1$ to $P_2$ given by y dB=10 $\log_{10}(P_1/P_2)$. For instance, if y=3, then $P_1 \approx 2 \times P_2$; if y=−3, then $P_1 \approx 0.5 \times P_2$. In practice, SINR is measured in dB, where $P_1$ corresponds to the received power of the pilot and $P_2$ corresponds to the received noise plus interference power.

b. High Rate Packet-Data TDM Communications

Under IS-2000, the highest rate of packet-data communications theoretically available on a fundamental traffic channel of the forward link is 9.6 kbps, dependent in part on the power allocated to the forward-link traffic channel and the resultant signal to noise characteristics. In order to provide higher rate packet-data service to support higher bandwidth applications, the industry introduced a new "high rate packet data (HRPD) system," which is defined by industry standard IS-856.

IS-856 leverages the asymmetric characteristics of most IP traffic, in which the forward link typically carries a higher load than the reverse link. Under IS-856, each access terminal maintains and manages an active set as described above, but receives forward-link transmission from only one active sector at a time. In turn, each sector transmits to all its active ATs on a common forward link using time division multiplexing (TDM), in order to transmit to only one access terminal at a time, but at the full power of the sector. As a result of the full-power allocation by the sector, an access terminal operating under IS-856 can, in theory, receive packet-data at a rate of at least 38.4 kbps and up to 2.4 Mbps. The reverse link under IS-856 retains largely the traditional IS-2000 code division multiplexing (CDM) format, albeit with the addition of a "data rate control" (DRC) channel used by the AT to indicate the supportable data rate and best serving sector for the forward link. More specifically, the DRC channel is a sub-channel of a reverse-link Medium Access Control (MAC) channel.

TDM access on the IS-856 forward link is achieved by dividing the forward link in the time domain into time slots of length 2048 chips each. At a chip rate of 1.228 Mega-chips per second, each slot has a duration of 1.67 milliseconds (ms). Each time slot is further divided into two 1024-chip half-slots, each half-slot arranged to carry a 96-chip pilot "burst" (pilot channel) at its center and a forward-link MAC channel in two 64-chip segments, one on each side of the pilot burst. The remaining 1600 chips of each time slot (800 per half-slot) are allocated for a forward traffic channel or a forward control channel, so that any given time slot will carry either traffic-channel data (if any exists) or control-channel data. As in IS-2000, each sector in IS-856 is defined by a PN offset, and the pilot channel carries an indication of the sector's PN offset. Again, a sector could correspond to a femtocell.

c. LTE Advanced Communications

Under LTE Advanced, the downlink comprises multiple frequency carrier bands arranged to cover a total bandwidth of up to 20 MHz (currently) in frequency space. Each frequency carrier band is divided into 12 orthogonal subcarrier frequencies, each 15 kHz in width, for a total of 180 kHz per frequency carrier band. The number of frequency carrier bands corresponds to the integer division of the total bandwidth by 180 kHz. For example, a total bandwidth of 1.25 MHz supports six frequency carrier bands; a total bandwidth of 20 MHz supports 100 frequency carrier bands. The orthogonality of the subcarrier frequencies follows from each being an integer multiple of the same minimum frequency; e.g., 15 kHz. It will be appreciated that a different minimum frequency could be used, as long as the orthogonality condition is met. Similarly, a different number of subcarrier frequencies per frequency carrier band could be used, which could then lead to a different number frequency carrier bands for a given total bandwidth.

In the time domain, the downlink comprises time slots, each typically of 0.5 msec duration. Every two time slots makes up one "sub-frame" of 1.0 msec duration, and every 10 sub-frames makes up a 10 msec frame. Each time slot is subdivided into an integer number of symbol durations, such that the integer number multiplied by the symbol duration equals 0.5 msec. According to current standards, the integer number is either 6 or 7; the value used depends on operating conditions, among other possible factors. For the purposes of the present discussion the integer number of symbol durations per time slot will be taken to be 7, with the understanding that other values could be used.

Transmissions on the downlink are scheduled in time-frequency units referred to as "resource blocks" or RBs. Each RB is made up of 7 contiguous symbol durations (i.e., one time slot) and 12 subcarrier frequencies of a given frequency carrier band. Thus, an RB can be viewed a grid of 7 symbol durations by 12 subcarrier frequencies. Each element of the grid is referred to as "resource element," and each resource element carries one OFDM symbol. Each OFDM symbol of a resource element is a time domain symbol generated from Fourier superposition frequency domain symbols.

A single RB is the smallest unit of allocation made for a given UE for downlink transmissions. Allocations are typically made by an eNodeB serving the UE, and more than one RB can be allocated for the UE. Multiple RB allocations for a given UE can be made across multiple frequency carrier bands, across multiple time slots, or both, depending on factors including the amount of data to be transmitted to the UE, the type of data (e.g., best-effort, real-time, etc.), and downlink resources needed for other UEs.

In addition to carrying OFDM symbols specific to a given UE, particular resource elements of a given RB are allocated as "reference signals," and may be used to carry pilot signals from the eNodeB. Upon detection of a pilot signal in one or more resource elements of an RB, a UE may determine SINR of the eNodeB (or more generally, the LTE Advanced base station) that made the RB-based transmission. The UE may then use the SINR (or other SNR measure) of different eNodeBs that it detects to determine if and when to hand off from one to another, for example.

DIVERSITY APPLIED TO MULTIPLE AIR-INTERFACE TECHNOLOGIES

In a wireless communication system, data are transmitted at a physical level by RF signals according, typically, to one or another air-interface technology, as described above. In preparation for physical transmission by a transmitting device, data may be organized or assembled into one or another form of what may be generically referred to as "communication units." Specific examples may include data packets and data frames, and in accordance with example embodiments, communication units will be taken to be data packets. More particularly, data packets prepared for transmission on a physical medium (e.g., an RF interface or a wireline interface) are customarily regarded as "medium access" or "MAC" packets. This terminology is in accordance with an architectural description of communication networks in terms of functional "layers," in which a MAC layer can be situated "above" and adjacent to a physical layer for transmission and reception of physical signals. As will be appreciated, there can be a hierarchy of data organization in which higher level packets (or other data units) are nested in lower level packets, down to MAC packets, for example.

At the receiving end of a transmission, a receiving device may detect, and thereby effectively receive, the transmitted signal (or signals), and process the received signal(s) into one or more received communication units. In keeping with the present discussion, received communication units may be one or more received versions of transmitted MAC packets. To the extent that the received versions of the MAC packets are identical to those transmitted by the transmitting device, the received MAC packets can be considered to be free of errors.

In practice, transmission errors on a forward link (or downlink) and/or a reverse link (or uplink) can lead to imperfectly received transmission signals, resulting in incomplete reception of data packets and/or data packets received with errors. Transmission errors could be caused by RF noise and/or interference, or underpowered transmissions, for example. Various approaches may be available for correcting errors in received data, and more generally for improving reliability of transmission. One approach that can be employed by different error correction techniques is to include some form of redundancy in the transmissions. As an example, forward error correction methods may encode redundant information such that a packet received with errors may nevertheless still contain sufficient and appropriate redundant information for a forward error correction algorithm implemented at the receiving device to reconstruct and recover an error-free version of the data packet from the received version of data packet.

One technique that employs redundancy is "diversity," in which multiple copies of the same data may be received on multiple transmissions. By appropriately encoding data packets upon transmission, error correction algorithms implemented on a receiving device may be able to recover error-free data packet by merging multiple received versions, some or all of which may contain errors due to imperfect transmission. Diversity techniques may further include or be based on forward error correction methods for deriving and processing redundant information from the multiple received copies of data packets.

In conventional applications of diversity, the multiple transmissions of the same data may be separated in time, space, or frequency, but otherwise each given diversity scheme utilizes a common air-interface technology for all of its multiple transmissions. Diversity techniques aim to derive benefit from potentially different characteristics of the different transmissions that may result from different transmission times for temporal diversity, different transmission paths for spatial diversity, or different carrier frequencies for frequency diversity. For example, in spatial diversity, different antenna elements may be used to transmit different copies of the same data packets. Each of possibly different resulting propagation paths to a receiving device may give rise to different degrees and/or characteristics of transmission errors, and correspondingly different received versions of the originally transmitted data packet. A forward error correction algorithm implemented on the receiving device may then be able to derive appropriate redundant information from the different received packets (some or all of which may contain errors) to reconstruct or recover an error-free version of the packet.

In a similar manner, redundant information derived from different versions of a packet received with errors on different carrier frequencies of a frequency diversity scheme may be used to recover an error free version of the packet. In the case of temporal diversity, different copies of the same packet may be received as an original transmission and one or more subsequent retransmissions, each subsequent retransmission being requested, for example, by the receiving device in response to errors in each received packet, and in conjunction with an incremental forward error correction algorithm requiring additional redundant information to complete recovery of an error-free version of the packet.

a. Temporal Diversity Example

Figure 4:
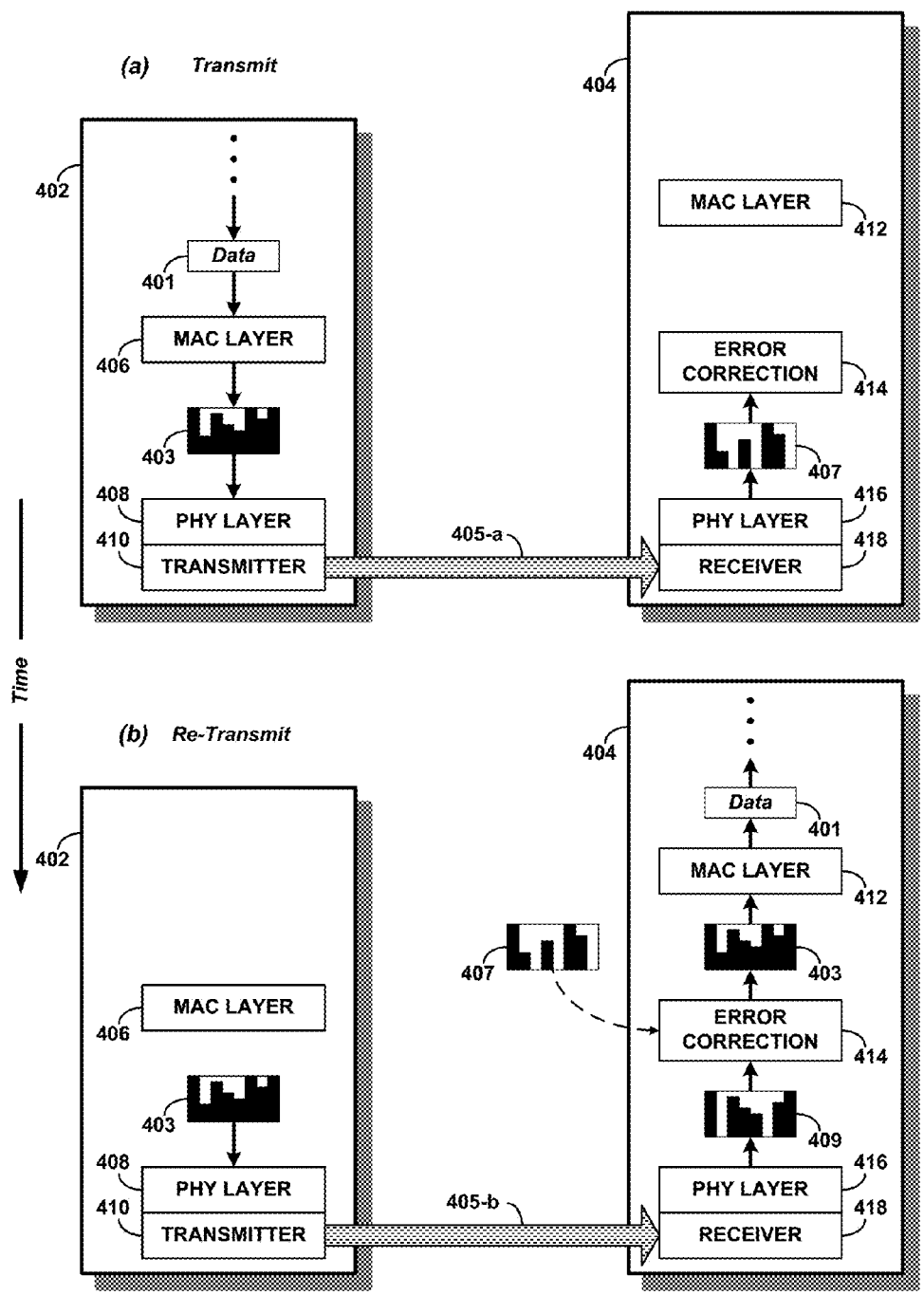
FIG. 4 is a conceptual illustration of example operation of temporal diversity.

A conceptual example of conventional temporal diversity is illustrated in FIG. 4, which depicts transmission and retransmission of data 401 by a transmitting device 402 and reception by a receiving device 404. To represent the temporal nature of the diversity scheme, FIG. 4 includes a transmission phase in a top panel labeled "(a) Transmit," and a subsequent retransmission phase in a bottom panel labeled "(b) Re-Transmit." An arrow labeled "Time" signifies the temporal progression from the transmission phase to the retransmission phase.

In the transmission phase of the example illustration, data 401 are presented to a MAC layer 406, which then packetizes the data 401 into a MAC packet 403. As a conceptual construct for the present discussion, the MAC packet 403 is represented as a pattern of black and white bars within a rectangular border. While the particular pattern is arbitrary, it serves as a visual cue for the effects of transmission errors and error correction in the context of temporal diversity, as described below. It will be appreciated that the data 401 could itself contain one or more forms of organized (e.g., structured) digital data, including nested data packets corresponding to one or more upper network layers, for example.

The MAC packet 403 is then presented to a physical ("PHY") layer 408 coupled with a transmitter 410 of the transmitting device 402. For example, the transmitter 410 could include one or more antennas and transceiver elements for transmitting RF signals on an air interface, such as a CDMA interface or an LTE Advanced interface, and the PHY layer 408 could include processing elements (e.g., one or more digital signal processors) for transforming the MAC packet 403 into physical signals appropriate for transmission on the air interface. Thus, acting together, the PHY layer 408 and transmitter 410 produce as physical output a transmission 405-a, which carries the MAC packet 403 in RF signals generated according the an RF technology of the PHY layer 408 and transmitter 410. Again as a visual cue, the transmission 405-a is depicted as a broad arrow filled in with a regular stippled pattern.

Continuing with the transmission phase, the receiving device 404 receives the transmission 405-a (physical RF signals) at a receiver 418 that is coupled with a PHY layer 416. The receiver 418 and PHY layer 416 may act together to recover a received version of the MAC packet 403 in the form of a received MAC packet 407. For example, the receiver 418 could include one or more antennas and transceiver elements for receiving RF signals on an air interface corresponding to the one used by the transmitter 410, and the PHY layer 416 could include processing elements (e.g., one or more digital signal processors) for transforming the received physical RF signal into the MAC packet 407.

By way of example, the MAC packet 407 is not identical to the original MAC packet 403 (as represented by a different pattern of black and white bars in the MAC packet 407), and may therefore be considered an erroneous or corrupted version of the original. Evidently (and by way of example), the transmission 405-a was subject to transmission errors during the transmission phase illustrated in FIG. 4. The received MAC packet 407 is then delivered to an error correction component 414 of the receiving device 404. For example, the error correction component could include storage for the MAC packet 407 and machine language instructions for implementing a forward error correction algorithm on one or more processors of the receiving device 404. The error correction component 414 may then determine that the MAC packet 407 contains insufficient information by itself to support recovery of the original MAC packet 403. The MAC packet 407 may be held in storage, at least temporarily, until a retransmission is received (or a timeout period expires, for example).

Although not necessarily shown explicitly in FIG. 4, the receiving device 404 could send an indication of the error to the transmitting device 402, thereby requesting a retransmission of the original MAC packet 403. For example the receiving device 404 could reply to the erroneous transmission with a "negative acknowledgement" or "NACK" that serves as a retransmission request. Alternatively, the receiving device 404 could omit any reply, which might then be interpreted by the transmitting device 402 as retransmission request signified by the lack of a positive acknowledgment of a successful receipt of the original MAC packet 403. Other techniques and/or protocols for indicating the need for a retransmission are possible as well.

In the retransmission phase of the example illustration (bottom panel), the original MAC packet 403 is transmitted again by the collective action of the PHY layer 408 and the transmitter 410, this time carried in a transmission 405-b. The same air interface is used for the retransmission, as represented by the same regular stippled pattern of the transmission 405-b as was used to depict the transmission 405-a. Again, the receiving device 404 receives the transmission 405-b at the receiver 418 and coupled PHY layer 416. This time, the original MAC packet 403 is received in the form of a received MAC packet 409, which, by way of example, is also an erroneous or corrupted version of the original. Also by way of example, the received MAC packet 409 is not identical to the earlier received MAC packet 407, although this difference is not necessarily significant or relevant to the process being illustrated.

The received MAC packet 409 is then delivered to the error correction component 414, which is still holding the received MAC packet 407, as indicated by a curved, dashed arrow from the MAC packet 407 to the error correction component 414. Evidently, and by way of example, the received MAC packets 407 and 409 together contain sufficient information to enable the error correction component 414 to recover the original MAC packet 403, which is shown as being delivered from the error correction component 414 to a MAC layer 412 in the receiving device 404. The MAC layer 412 may then recover the original data 401, which can be delivered to one or more upper network layers for processing and/or consumption.

Some of the general concepts illustrated for conventional temporal diversity can be applied to conventional spatial and frequency diversity. In each of these cases, instead of transmitting redundant packets separated in time, redundant packets may be transmitted concurrently on different antennas (resulting in different propagation paths between a transmitting device and a receiving device), or on different carrier frequencies. However, the way in which a receiving device may employ error correction to recover an error-free packet by merging multiple copies of received versions of a transmitted packet is otherwise similar to how this may be achieved with temporal diversity.

As described above, conventional diversity techniques apply a single air-interface technology in any given instance. Consequently, any benefit derived from potentially different characteristics of the different transmissions will typically result from differences due to different transmission times for temporal diversity, different transmission paths for spatial diversity, or different carrier frequencies for frequency diversity. It may happen that RF operating conditions that tend to give rise to error-prone transmissions, or otherwise suboptimal reliability of transmissions, impact different air-interface technologies in a disproportionate way. For example, one air-interface technology may suffer more under particular conditions than another. Or two or more air-interface technologies may provide complementary types of resiliency to RF operating conditions in a common region (e.g., cell or sector) at a common time. For these and similar types of circumstances, providing a capability to transmit redundant communication units (e.g., data packet) concurrently using two or more different air-interface technologies can offer a significant improvement to transmission reliability and error recovery techniques. Because this type redundancy employs multiple types of air-interface technologies, it is referred to herein as "inter-technology diversity." Inter-technology diversity is described by way of example below.

b. Example Embodiment of Inter-Technology Diversity

Figure 5:
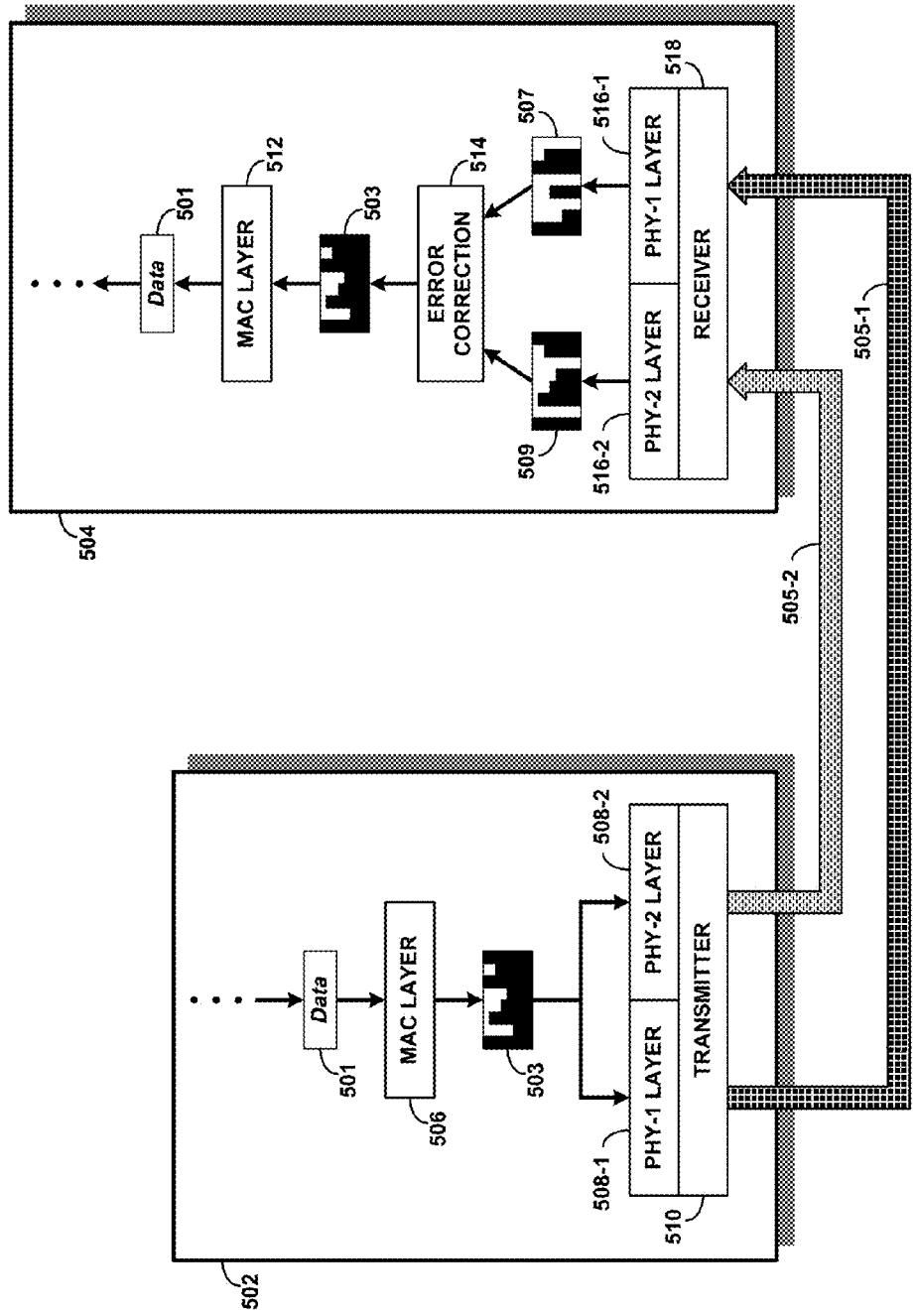
FIG. 5 is a conceptual illustration of example operation of inter-technology diversity, in accordance with example embodiments.

FIG. 5 is a conceptual illustration of example operation of inter-technology diversity, in accordance with example embodiments. In the example illustrated, a multi-modal transmitting device 502 transmits data 501 to a multi-modal receiving device 504. A MAC layer 506 in the transmitting device 501 first packetizes the data 501 into a MAC packet 503. Again, MAC packets are represented visually as patterns of black and white bars bordered by rectangles, and MAC packets with different patterns represent non-identical data.

As shown, the transmitting device 502 includes, by way of example, two physical layers, PHY layer 508-1 and PHY layer 508-2, each coupled with a transmitter 510. The two physical layers of the transmitting device 502 may be considered as implementing two different types of air-interface technologies, and the transmitter 510 may be considered as including transceiver elements and/or antennas for generating and transmitting signals of both types of air-interface technologies. Similarly, the receiving device 504 includes, also by way of example, two physical layers, PHY layer 516-1 and PHY layer 516-2, each coupled with a receiver 518. The two physical layers of the receiving device 504 may be considered as implementing the same two types of air-interface technologies as the transmitting device 502, and the receiver 518 may be considered as including transceiver elements and/or antennas for detecting and receiving signals of both types of air-interface technologies. It will be appreciated that both the transmitting device 502 and the receiving device 504 could include air interfaces of additional air-interface technologies as well, although the two devices do not necessarily have to include more than two of the same type of air-interface technologies in order to implement inter-technology diversity.

In accordance with example embodiments, the MAC packet 503 is concurrently presented to both the PHY layer 508-1 and the PHY layer 508-2. Each physical layer, acting with the transmitter 510, then concurrently transmits a copy of the MAC packet 503 in the form of signals generated and transmitted in accordance with the respective air-interface technology. Thus, the PHY layer 508-1 and transmitter 510 produce as physical output a transmission 505-1, and the PHY layer 508-2 and transmitter 510 produce as physical output a transmission 505-2. For purposes of illustration, the transmission 505-1 is depicted as a broad arrow filled in with a regular grid-like pattern, and the transmission 505-2 is depicted as a broad arrow filled in with a regular stippled pattern. The two different patterns serve as a visual cue that the two air-interface technologies of the example are different.

In further accordance with example embodiments, the receiving device 504 receives the transmission 505-1 (physical RF signals) at the receiver 518 that is coupled with the PHY layer 516-1, and receives the transmission 505-2 at the receiver 518 that is also coupled with the PHY layer 516-2. The receiver 518 and PHY layer 516-1 may act together to recover a received version of the MAC packet 503 in the form of a received MAC packet 507, and the receiver 518 and PHY layer 516-2 may act together to recover a received duplicate version of the MAC packet 503 in the form of a received MAC packet 509. Evidently, and by way of example, each of the received MAC packets 507 and 509 have been received in error, since neither one is identical to the original MAC packet 503 (as represented visually by the different black and white bar patterns of the MAC packets).

In accordance with example embodiments, both MAC packets 507 and 509 can be presented to an error correction component 514 of the receiving device 504. For example, the error correction component could include storage for the MAC packets 507 and 509 and machine language instructions for implementing a forward error correction algorithm on one or more processors of the receiving device 504. Evidently, and by way of example, the received MAC packets 507 and 509 together contain sufficient information to enable the error correction component 514 to recover the original MAC packet 503, which is shown as being delivered from the error correction component 514 to a MAC layer 512 in the receiving device 504. The MAC layer 512 may then recover the original data 501, which can be delivered to one or more upper network layers for processing and/or consumption.

By applying error correction to multiple copies of a MAC packet concurrently transmitted on different air interfaces, a receiving device may derive benefits of inter-technology diversity. And by concurrently transmitting multiple copies of a MAC packet on different air-interface technologies, a transmitting device may provide benefits of inter-technology diversity to a receiving device. It will be appreciated that inter-technology diversity can be extended to more than just two different air-interface technologies as in the example of FIG. 5.

In the example of FIG. 5, it has been assumed implicitly that the PHY layers 508-1 and 508-2 both process the same form of MAC packet, so that each may receive the same MAC packet 503. Similarly it has been assumed implicitly that the PHY layers 516-1 and 516-2 both output the same form of MAC packet, so that their respective outputs of MAC packets 507 and 509 can both be input to the error correction component 514. In some systems, it may be the case that different physical layer are associated (on input and/or output) with different forms of MAC packets, or more generally, different forms of communication units (e.g., frames). For such systems, there can still be a common form of data packet (or communication unit) suitable for inter-technology diversity at a network layer above the MAC layer. That is, inter-technology diversity may be implemented at any network layer for which communication units (e.g., data packets) have a common form for transmission and reception on two or more different air-interface technologies.

Inter-technology diversity for wireless communications can be implemented by any pair of transmitting and receiving devices that employ at least two air-interface technologies in common. In accordance with example embodiments, the transmitting device could be a multi-modal base station or base station element, such as a BTS/eNodeB, an RNC, or a BSC, and the receiving device could be a multi-modal AT or UE. Additionally or alternatively, the transmitting device could be a multi-modal AT or UE, and the receiving device could be a multi-modal base station or base station element. Here, the term "multi-modal" refers to implementation of two or more air-interface technologies.

In practice, the RF operating conditions in a given vicinity (e.g., cell or sector) and at a given time may be such that transmissions on forward and/or reverse links between a base station and one or more ATs have a sufficiently low error rates so as to reduce the need to rely the enhanced error correction afforded by inter-technology diversity. For example, RF noise and/or interference may be relatively low. Additionally or alternatively, load conditions—e.g., relating to the number of ATs or UEs with active communication sessions in a cell or sector—may be such that the benefits of using inter-technology diversity for one or more forward and/or reverse links are, or begin to be, outweighed by additional load that may result from redundant transmissions. There may be other operating conditions that warrant evaluation before inter-technology diversity is put into use, or "made active," at a given time. Hence, embodiments of inter-technology diversity may also include criteria for determining whether or not to activate inter-technology diversity at any given time in a cell or sector (or other form of wireless coverage area), procedures for applying the criteria, and procedures for causing ATs and/or base station (or base station elements) to activate inter-technology diversity.

In accordance with example embodiments, a multi-modal base station or base station element (or other RAN element) may include aspects relating to dynamic activation and deactivation of inter-technology diversity. More particularly, a base station may continuously monitor error rates on forward and reverse links, as well as loading conditions in a given cell or sector, and apply the real-time monitoring results to criteria for dynamic activation and deactivation of inter-technology diversity, in order to determine if and when to activate and/or deactivate inter-technology diversity on any one or more forward or reverse links in the monitored cell or sector.

Activation and deactivation of inter-technology diversity may be implemented as different operational modes of transmitting and receiving devices in the context of a communication session. For example, a communication session may be initially set up between an AT and a base station using just one air-interface technology, such as IS-856, and with inter-technology diversity inactive. During the course of the communication session, the base station may determine that one or more operating conditions meet one or more criteria for activating inter-technology diversity using a second air-interface technology, such as LTE Advanced, on the forward and/or reverse link of the communication session. In response to the determination, the base station may then trigger activation of inter-technology diversity whichever of the forward and/or reverse links the criteria apply.

For inter-technology activation on the forward link, the base station may send an instruction to the AT to begin receiving communication units of the communication session on both air interfaces—IS-856 and LTE Advanced in this example—as described above. The base station will then begin transmitting communication units on both air interfaces, also as described above. For inter-technology activation on the reverse link, the base station may send an instruction to the AT to begin transmitting communication units of the communication session on both air interfaces—IS-856 and LTE Advanced in this example—as described above. The base station will then begin receiving communication units on both air interfaces, also as described above. It will be appreciated that activation could involve different and/or additional air-interface technologies for use in inter-technology diversity.

During active mode operation of inter-technology diversity, the base station may determine that operating conditions no longer meet sufficient criteria for activation. In response, the base station may deactivate inter-technology diversity on whichever of the forward and/or reverse links is currently in active mode. The base station may send an instruction to the AT to return to the inactive operational mode of inter-technology diversity, and the base station will also return to the inactive mode for the appropriate link. Note that it may be possible that in determining that current operation of inter-technology diversity should be deactivated, it is also determined that communications should continue on a different air interface than the one initially used prior to activation of inter-technology diversity. For the example, a communication session may be set up using IS-856, transition to active mode using LTE Advance with IS-856, and then transition to inactive mode using LTE Advanced.

In further accordance with example embodiments, a multi-modal base station may trigger activation of inter-technology diversity based on one or more of criteria of capacity utilization in a cell or sector (e.g., load), criteria based on error rate, or criteria based on a type of data to be transmitted and/or a type of application that utilizes the data to be transmitted. More particularly, adopting terminology in which a "first" air-interface technology is used during an inactive mode and a "second" air-interface technology is added upon transition to an active mode, capacity-based criteria could apply a utilization threshold to the second air-interface technology to determine whether or not to trigger activation. For example, if utilization of the second air-interface technology is less than 50%, then the base station may trigger activation of inter-technology diversity using the second air-interface technology in addition to the first. If utilization is above 50%, then the base station may forgo triggering activation.

Similarly, error-rate-based criteria could apply an error rate threshold to the first air-interface technology to determine whether or not to trigger activation using a second air-interface technology. By way of example, if the first air-interface technology is LTE Advanced, and the block error rate is greater than 5% on the uplink and/or downlink, then the base station may trigger activation of inter-technology diversity using a second air-interface technology, such as WiFi. As another example, if the first air-interface technology is WiFi, and the packet error rate is greater than 2% on the uplink and/or downlink, then the base station may trigger activation of inter-technology diversity using a second air-interface technology, such as LTE Advanced.

Criteria based on a type of data to be transmitted and/or a type of application that utilizes the data to be transmitted could take account of factors such as sensitivity and/or criticality of applications in connection with latency and/or reliability of data transfers between senders and receivers, and volume of data to be transmitted. For example, if a UE is to transmit a data file that exceeds 2 Megabytes (MB) in size on an uplink to an eNodeB that is part of a multi-modal base station, then the base station may trigger activation of inter-technology diversity on the uplink using an additional air-interface technology, such as IS-856 or WiFi. Similarly, if an eNodeB of a multi-modal base station is to transmit a data file that exceeds 5 MB in size on a downlink to a UE, then the base station may trigger activation of inter-technology diversity on the downlink using an additional air-interface technology, again such as IS-856 or WiFi.

Examples of applications that may be sensitive to latency and/or reliability or for which latency and/or reliability of data transfers may be critical could include financial transactions and reservation transactions, among others. If a multi-modal base station determines that data are to be transferred on a forward and/or reverse link with an AT for such an application, it may then trigger activation of inter-technology diversity on the appropriate link or links.

As described above, inter-technology diversity derives benefits of different characteristics of transmissions made using different air-interface technologies. For example, different air-interface technologies may provide complementary forms of resiliency to RF operating conditions, such that using them both concurrently helps enhance transmission reliability. In practice, different air-interface technologies may also support different transmission rates and/or bandwidths, either inherently and/or due to current RF operating conditions. Consequently, concurrent transmission by a transmitting device of a MAC packet (or other suitable communication unit) on two or more different air interfaces may not necessarily lead to concurrent, complete reception of the two or more received versions of the MAC packet at a receiving device. That is, a received version MAC packet may be completely received (possibly with errors) on one air interface before it is completely received (also possibly with errors) on another air interface, even if the two transmissions were concurrent, and even if some portion of the reception process on both air interfaces was concurrent. Inter-technology diversity may therefore also include aspects for accounting for differences in the time it takes to completely receive two or more received versions of a communication unit on two or more different air interfaces.

In accordance with example embodiments, a receiving device with inter-technology diversity active may hold (e.g., buffer) a communication unit received on one air interface while it waits for reception of a duplicate of the communication to complete on one or more other air interfaces. Once reception is complete on all air interfaces being used, the received versions of the communication units may be delivered to a forward error-correction component for recovery of an error-free version of the communication unit, as described above.

In further accordance with example embodiments, the receiving device, after completely receiving a communication unit on one air interface and while still in the process of receiving it on one or more other air interfaces, may determine that the completely received communication unit is either error-free or contains sufficient error-free information by itself to be processed into an error-free communication unit by the forward error-correction component. In this instance, continued reception of the communication unit on the one or more other air interfaces may be superfluous for purposes of error correction, and may therefore be discontinued. Even if continued to completion, the other version (or versions) of the communication unit on the one or more other air interfaces may be discarded, since an error-free version may have already been recovered.

IMPLEMENTATION OF EXAMPLE EMBODIMENT

As described above, the example embodiment involves actions and operations carried out by a transmitting device and also by a receiving device. Accordingly, the example embodiment can be implemented as aspects of each type of device. An example multi-modal AT (or UE) and an example multi-modal base station are each described below.

a. Example Access Terminal

Figure 6:
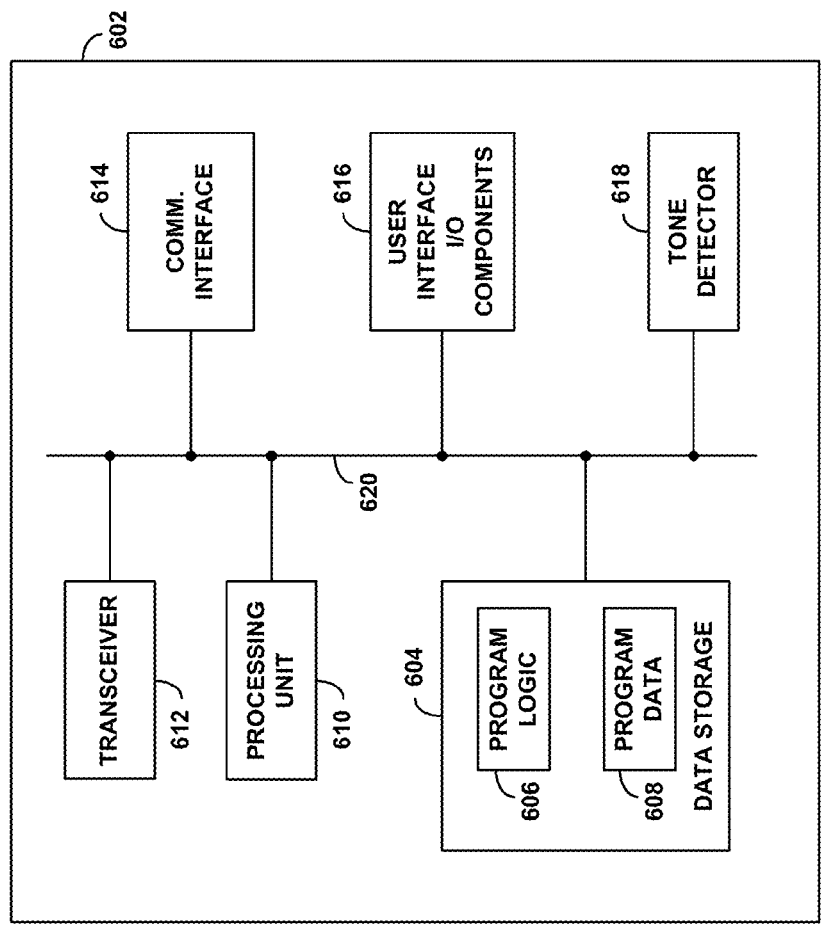
FIG. 6 is a simplified block diagram of an example access terminal or user equipment configured for carrying out inter-technology diversity, in accordance with example embodiments.

FIG. 6 is a simplified block diagram depicting functional components of an example multi-modal access terminal 602 in which an example embodiment of inter-technology diversity could be implemented. The example AT 602 could be a cell phone, a personal digital assistant (PDA), a pager, a wired or wirelessly-equipped notebook computer, or any other sort of device. As shown in FIG. 6, the example AT 602 includes data storage 604, processing unit 610, transceiver 612, communication interface 614, user-interface I/O components 616, and tone detector 618, all of which may be coupled together by a system bus 620 or other mechanism.

These components may be arranged to support operation in a wireless communication network that is compliant with a variety of wireless air-interface protocols, such as network 300 illustrated in FIG. 3. In particular, these components can support concurrent communication on two or more air interfaces, in accordance with example embodiments.

Communication interface 614 in combination with transceiver 612, which may include one or more antennas, enables communication with the network, transmission of communication units to the network, and reception of communication units from the network. The communication interface may include a module, such as an MSM™-series chipset made by Qualcomm Inc. of San Diego, Calif., and supports wireless packet-data communications according to a CDMA family of protocols.

Processing unit 610 comprises one or more general-purpose processors (e.g., INTEL microprocessors) and/or one or more special-purpose processors (e.g., dedicated digital signal processor, vocoder, application specific integrated circuit, etc.). In turn, the data storage 604 comprises one or more volatile and/or non-volatile storage components, such as magnetic or optical memory or disk storage. Data storage 604 can be integrated in whole or in part with processing unit 610, as cache memory or registers for instance. In example AT 602, as shown, data storage 604 is configured to hold both program logic 606 and program data 608.

Program logic 606 may comprise machine language instructions that define routines executable by processing unit 610 to carry out various functions described herein. In particular the program logic, communication interface, and transceiver may operate cooperatively to carry out logical operation, such as concurrent transmission of communication units on two or more different air interfaces, concurrent reception of communication units on two or more different air interfaces, and other functions discussed above.

It will be appreciated that there can be numerous specific implementations of an access terminal, such as AT 602, in which inter-technology diversity could be implemented. Further, one of skill in the art would understand how to devise and build such an implementation. As such, AT 602 is representative of means for carrying out inter-technology diversity, in accordance with the methods and steps described herein by way of example.

b. Example Base Station

Figure 7:
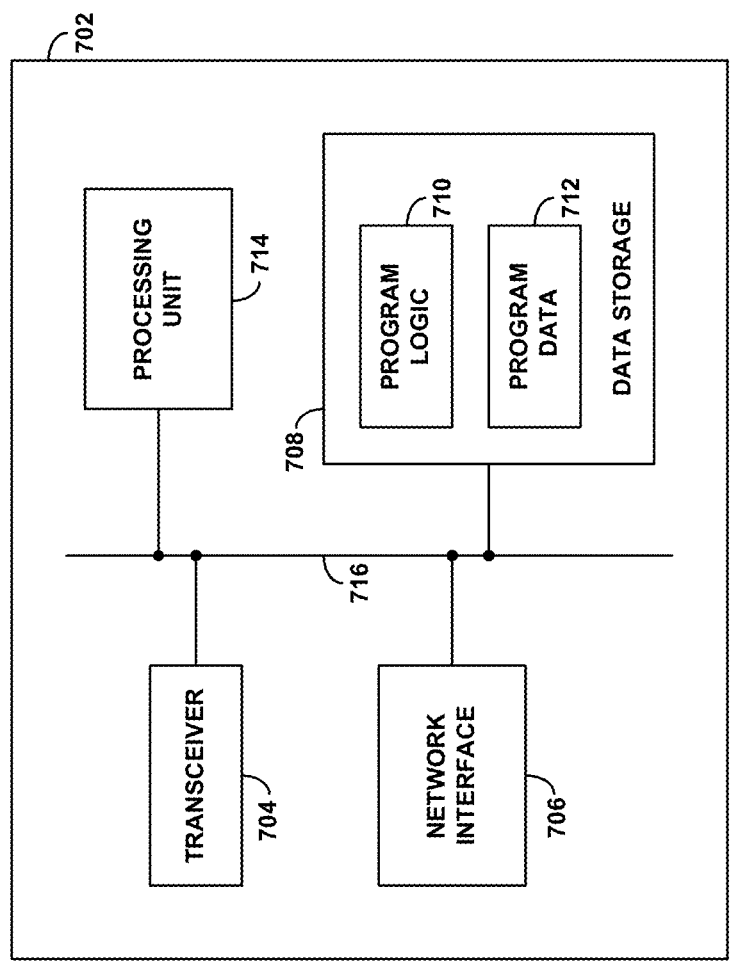
FIG. 7 is a simplified block diagram of an example base station or other access node configured for carrying out inter-technology diversity, in accordance with example embodiments.

FIG. 7 is a simplified block diagram depicting functional components of an example multi-modal base station 702 in which an example embodiment of inter-technology diversity could be carried implemented. As shown in FIG. 7, the example base station 702, representative of the multi-modal access node 304 in FIG. 3, for instance, includes a transceiver 704, network interface 706, a processing unit 714, and data storage 708, all of which may be coupled together by a system bus 716 or other mechanism. In addition, the base station may also include external storage, such as magnetic or optical disk storage, although this is not shown in FIG. 7.

These components may be arranged to support wireless communications in a wireless communication network that is compliant with a variety of wireless air-interface protocols, such as network 300 illustrated in FIG. 3. In particular, these components can support concurrent communication on two or more air interfaces, in accordance with example embodiments.

Network interface 706 enables communication on a network, such network 300. As such, network interface 706 may take the form of an Ethernet network interface card or other physical interface to a broadband connection to the internet or some other data network. Further, network interface 706 in combination with transceiver 704, which may include one or more multi-modal antennas, enables air interface communication with one or more access terminals, supporting both downlink and uplink transmissions.

Processing unit 714 comprises one or more general-purpose processors (e.g., INTEL microprocessors) and/or one or more special-purpose processors (e.g., dedicated digital signal processor, application specific integrated circuit, etc.). In turn, the data storage 708 comprises one or more volatile and/or non-volatile storage components, such as magnetic or optical memory or disk storage. Data storage 708 can be integrated in whole or in part with processing unit 714, as cache memory or registers for instance. As further shown, data storage 708 is equipped to hold program logic 710 and program data 712.

Program data 712 may comprise data such as one or another threshold applied in determining when to trigger activation of inter-technology diversity. Program logic 710 may comprise machine language instructions that define routines executable by processing unit 714 to carry out various functions described herein. In particular the program logic, communication interface, and transceiver may operate cooperatively to carry out logical operation, such as concurrent transmission of communication units on two or more different air interfaces, concurrent reception of communication units on two or more different air interfaces, and other functions discussed above.

It will be appreciated that there can be numerous specific implementations of multi-modal base station, such as base station 702, in which inter-technology diversity could be implemented. Further, one of skill in the art would understand how to devise and build such an implementation. As such, base station 702 is representative of means for carrying out inter-technology diversity, in accordance with the methods and steps described herein by way of example.

CONCLUSION

An example embodiment has been described above. Those skilled in the art will understand, however, that changes and modifications may be made to this embodiment without departing from the true scope and spirit, which is defined by the claims.

We claim:

1. In a first device communicatively coupled with a second device via a multi-technology air interface, a method comprising:

while operating in a single-technology mode, (i) engaging in a communication session with the second device using a single air-interface technology to receive communication units of the communication session transmitted by the second device via a first air-interface technology, and (ii) receiving an indication to activate operating in a diversity mode in which the first device is configured to receive communication units of the communication session concurrently on a plurality of air-interface technologies;

while operating in the diversity mode, receiving a first signal transmitted by the second device via the first air-interface technology, the first signal carrying a particular communication unit of the communication session;

while operating in the diversity mode, concurrently with receiving the first signal, receiving a second signal transmitted by the second device via a second air-interface technology, the second signal carrying a duplicate of the particular communication unit of the communication session, wherein the first air-interface technology and the second air-interface technology are different;

while operating in the diversity mode, recovering both a received version of the particular communication unit from the received first signal and a received version of the duplicate of the particular communication unit from the received second signal; and while operating in the diversity mode, merging the received version of the particular communication unit and the received version of the duplicate of the particular communication unit according to an error-correction algorithm to recover a transmission-error-free copy of the particular communication unit of the communication session, wherein recovering both the received version of the particular communication unit from the received first signal and the received version of the duplicate of the particular communication unit from the received second signal comprises discontinuing recovery of the received version of the duplicate of the particular communication unit upon a prior determination that a level of transmission error of the received version of the particular communication unit is below an error threshold, wherein merging the received version of the particular communication unit and the received version of the duplicate of the particular communication unit according to the error-correction algorithm comprises applying error correction to only the received version of the particular communication unit if the level of transmission error of the received version of the particular communication unit is below the error threshold, and wherein applying error correction to only the received version of the particular communication unit comprises bypassing error correction if the received version of communication unit is free of transmission errors.

2. The method of claim 1, further comprising:

concurrently with receiving the first signal, receiving at least one additional signal transmitted by the second device via a corresponding one additional air-interface technology, the at least one additional signal carrying a corresponding additional duplicate of the particular communication unit, wherein the corresponding one additional air-interface technology is different from both the first air-interface technology and the second air-interface technology;

recovering a received version of the corresponding additional duplicate of the particular communication unit from the received at least one additional signal; and additionally merging the corresponding additional duplicate of the particular communication unit with both the received version of the particular communication unit and the received version of the duplicate of the particular communication unit according to the error-correction algorithm to recover the transmission-error-free copy of the particular communication unit.

3. The method of claim 1, wherein the first device is of a first type and the second device is of a second device type, wherein the first device type is different from the second device type, wherein the first device type is selected from the group consisting of an access terminal configured for operating in a wireless communication system, and a base station that is part of the wireless communication system, and wherein the second device type is selected from the group consisting of an access terminal configured for operating in a wireless communication system, and a base station that is part of the wireless communication system.

4. The method of claim 1, wherein the particular communication unit is a data packet.

5. The method of claim 4, wherein recovering both the received version of the particular communication unit from the received first signal and the received version of the duplicate of the particular communication unit from the received second signal further comprises:

processing the received first signal with a receiver operating according to the first air-interface technology to generate a received version of the data packet; and processing the received second signal with a receiver operating according to the second air-interface technology to generate a received version of a duplicate of the data packet.

6. The method of claim 5, wherein merging the received version of the particular communication unit and the received version of the duplicate of the particular communication unit according to the error-correction algorithm to recover the transmission-error-free copy of the particular communication unit further comprises:

processing the received version of the data packet together with the received version of the duplicate of the data packet with a forward error correction algorithm to generate a copy of the data packet that is free of transmission errors.

7. The method of claim 1, wherein the first air-interface technology is selected from the group consisting of 1X-RTT, EVDO, Long Term Evolution (LTE), WiFi, and WiMax, and wherein the second air-interface technology is selected from the group consisting of 1X-RTT, EVDO, Long Term Evolution (LTE), WiFi, and WiMax.

8. A first device configured for communicating with a second device via a multi-technology air interface, the first device comprising:

one or more processors;

memory; and machine-readable instructions stored in the memory, that upon execution by the one or more processors cause the first device to carry out operations comprising:

while operating in a single-technology mode, (i) engaging in a communication session with the second device using a single air-interface technology to receive communication units of the communication session transmitted by the second device via a first air-interface technology, and (ii) receiving an indication to activate operating in a diversity mode in which the first device is configured to receive communication units of the communication session concurrently on a plurality of air-interface technologies;

while operating in the diversity mode, receiving a first signal transmitted by the second device via the first air-interface technology, wherein the first signal carries a particular communication unit of the communication session, while operating in the diversity mode, concurrently with receiving the first signal, receiving a second signal transmitted by the second device via a second air-interface technology, wherein the second signal carries a duplicate of the particular communication unit of the communication session, and wherein the first air-interface technology and the second air-interface technology are different, while operating in the diversity mode, recovering both a received version of the particular communication unit from the received first signal and a received version of the duplicate of the particular communication unit from the received second signal, and while operating in the diversity mode, merging the received version of the particular communication unit and the received version of the duplicate of the particular communication unit according to an error-correction algorithm to recover a transmission-error-free copy of the particular communication unit of the communication session, wherein recovering both the received version of the particular communication unit from the received first signal and the received version of the duplicate of the particular communication unit from the received second signal comprises discontinuing recovery of the received version of the duplicate of the particular communication unit upon a prior determination that a level of transmission error of the received version of the particular communication unit is below an error threshold, wherein merging the received version of the particular communication unit and the received version of the duplicate of the particular communication unit according to the error-correction algorithm comprises applying error correction to only the received version of the particular communication unit if the level of transmission error of the received version of the particular communication unit is below the error threshold, and wherein applying error correction to only the received version of the particular communication unit comprises bypassing error correction if the received version of communication unit is free of transmission errors.

9. The first device of claim 8, wherein the operations further comprise:

concurrently with receiving the first signal, receiving at least one additional signal transmitted by the second device via a corresponding one additional air-interface technology, wherein the at least one additional signal carries a corresponding additional duplicate of the particular communication unit, and wherein the corresponding one additional air-interface technology is different from both the first air-interface technology and the second air-interface technology;

recovering a received version of the corresponding additional duplicate of the particular communication unit from the received at least one additional signal; and additionally merging the corresponding additional duplicate of the particular communication unit with both the received version of the particular communication unit and the received version of the duplicate of the particular communication unit according to the error-correction algorithm to recover the transmission-error-free copy of the particular communication unit.

10. The first device of claim 8, wherein the first device is of a first type and the second device is of a second device type, wherein the first device type is different from the second device type, wherein the first device type is selected from the group consisting of an access terminal configured for operating in a wireless communication system, and a base station that is part of the wireless communication system, and wherein the second device type is selected from the group consisting of an access terminal configured for operating in a wireless communication system, and a base station that is part of the wireless communication system.

11. The first device of claim 8, wherein the particular communication unit is a data packet, wherein recovering both the received version of the particular communication unit from the received first signal and the received version of the duplicate of the particular communication unit from the received second signal further comprises:

processing the received first signal with a receiver operating according to the first air-interface technology to generate a received version of the data packet; and processing the received second signal with a receiver operating according to the second air-interface technology to generate a received version of a duplicate of the data packet, and wherein merging the received version of the particular communication unit and the received version of the duplicate of the particular communication unit according to the error-correction algorithm to recover the transmission-error-free copy of the particular communication unit further comprises:

processing the received version of the data packet together with the received version of the duplicate of the data packet with a forward error correction algorithm to generate a copy of the data packet that is free of transmission errors.

12. The first device of claim 8, wherein the first air-interface technology is selected from the group consisting of 1X-RTT, EVDO, Long Term Evolution (LTE), WiFi, and WiMax, and wherein the second air-interface technology is selected from the group consisting of 1X-RTT, EVDO, Long Term Evolution (LTE), WiFi, and WiMax.

* * * * *